(12) United States Patent
Higbie et al.

(10) Patent No.: US 10,288,399 B2
(45) Date of Patent: May 14, 2019

(54) BLADE GEOMETRY CHARACTERIZATION TOOL

(71) Applicant: Sikorsky Aircraft Corporation, Stratford, CT (US)

(72) Inventors: Robert D. Higbie, Haslet, TX (US); Jose DeAnda, Dallas, TX (US); Sven Roy Lofstrom, Irving, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 187 days.

(21) Appl. No.: 15/323,591

(22) PCT Filed: Jun. 24, 2015

(86) PCT No.: PCT/US2015/037371
§ 371 (c)(1),
(2) Date: Jan. 3, 2017

(87) PCT Pub. No.: WO2016/003721
PCT Pub. Date: Jan. 7, 2016

(65) Prior Publication Data
US 2017/0138715 A1 May 18, 2017

Related U.S. Application Data

(60) Provisional application No. 62/019,617, filed on Jul. 1, 2014.

(51) Int. Cl.
*G01B 5/02* (2006.01)
*G01B 5/24* (2006.01)
(Continued)

(52) U.S. Cl.
CPC ............... *G01B 3/004* (2013.01); *G01B 3/02* (2013.01); *G01B 3/20* (2013.01); *G01B 5/02* (2013.01); *G01B 5/24* (2013.01); *G01B 11/24* (2013.01)

(58) Field of Classification Search
CPC ........ G01B 3/004; G01B 11/02; G01B 11/24; G01B 5/02; G01B 5/24
(Continued)

(56) References Cited

U.S. PATENT DOCUMENTS 2,638,680 A * 5/1953 Baker .................... G01B 5/205
235/61 E
2,737,722 A 3/1956 Keim
(Continued)

FOREIGN PATENT DOCUMENTS

DE 20110825 U1 12/2001
GB 2462829 A * 2/2010 ............. G01B 11/14
WO 2009143848 A2 12/2009

OTHER PUBLICATIONS

PCT Application No. PCT/US15/37371; ISR/WO, Issued Sep. 21, 2015, U330298PCT.
(Continued)

*Primary Examiner* — Christopher W Fulton
(74) *Attorney, Agent, or Firm* — Cantor Colburn LLP

(57) ABSTRACT

A tool is provided for characterizing a blade geometry. The tool includes a first component attachable to a blade root of a blade and a second component attachable to leading and trailing edges of the blade at a blade tip and at multiple stations defined along a span-wise dimension of the blade. The second component is configured for characterization of a chord length of the blade at the blade tip and at the multiple stations. The first and second components are respectively configured for cooperative optical characterization of a sweep and a twist angle of the blade at the blade tip and at the multiple stations.

14 Claims, 4 Drawing Sheets

(51) Int. Cl.
  *G01B 3/00* (2006.01)
  *G01B 11/24* (2006.01)
  *G01B 3/02* (2006.01)
  *G01B 3/20* (2006.01)

(58) Field of Classification Search
  USPC .......................................... 33/228, 1 BB, 530
  See application file for complete search history.

(56) References Cited

U.S. PATENT DOCUMENTS

| | | | | |
|---|---|---|---|---|
| 3,840,301 A | * | 10/1974 | Pryor | .................... G01B 5/205 |
| | | | | 356/505 |
| 3,996,670 A | * | 12/1976 | Joyal | ..................... G01B 5/242 |
| | | | | 33/530 |
| 4,056,888 A | | 11/1977 | Hughey | |
| 4,146,967 A | | 4/1979 | Rohner et al. | |
| 4,226,536 A | * | 10/1980 | Dreyfus | ................. G01B 5/205 |
| | | | | 250/224 |
| 4,248,572 A | | 2/1981 | Fradenburgh | |
| 4,265,023 A | | 5/1981 | Frost et al. | |
| 4,422,757 A | | 12/1983 | Munski | |
| 4,718,172 A | * | 1/1988 | Rouse | ..................... G01B 5/24 |
| | | | | 33/530 |
| 5,152,070 A | * | 10/1992 | Sorokes | ................. G01B 5/004 |
| | | | | 33/1 M |
| 5,162,659 A | | 11/1992 | Diamond et al. | |
| 5,625,958 A | * | 5/1997 | DeCoursey | ............ G01B 5/205 |
| | | | | 33/1 BB |
| 6,532,678 B2 | | 3/2003 | Morgan | |
| 7,252,479 B2 | | 8/2007 | Bagai et al. | |
| 7,296,362 B2 | | 11/2007 | Chang | |
| 7,403,294 B2 | | 7/2008 | Handman et al. | |
| 7,434,328 B2 | | 10/2008 | Landino et al. | |
| 7,562,464 B2 | | 7/2009 | Chang | |
| 7,637,026 B2 | | 12/2009 | Tu | |
| 7,681,325 B2 | | 3/2010 | Sassatelli et al. | |
| 7,990,547 B2 | | 8/2011 | Robinson et al. | |
| 8,127,581 B2 | | 3/2012 | Davis et al. | |
| 8,196,305 B1 | | 6/2012 | Hansen et al. | |
| 8,347,746 B2 | | 1/2013 | Hafenrichter et al. | |
| 2007/0209223 A1 | * | 9/2007 | Frank | ...................... G01C 9/06 |
| | | | | 33/530 |
| 2008/0229603 A1 | | 9/2008 | King et al. | |
| 2009/0266160 A1 | * | 10/2009 | Jeffrey | .................. G01H 1/006 |
| | | | | 73/455 |
| 2013/0192374 A1 | * | 8/2013 | Voor, Jr. | ................ G01N 29/11 |
| | | | | 73/627 |
| 2014/0054476 A1 | * | 2/2014 | Zheng | .................... F03D 17/00 |
| | | | | 250/578.1 |

OTHER PUBLICATIONS

Extended European Search Report for European Application No. 15814287.7; dated Jan. 16, 2018; 7 pages.

German Patent No. 20110825; Date of Publication: Dec. 13, 2001; Machine Translation, 4 pages.

* cited by examiner

BLADE GEOMETRY CHARACTERIZATION TOOL

This application is a National Phase Application of Patent Application PCT/US15/37371 filed on Jun. 24, 2015, which claims the benefit of and priority to U.S. Provisional Patent Application Ser. No. 62/019,617 filed on Jul. 1, 2014, the contents of which are incorporated herein by reference in their entirety.

BACKGROUND OF THE INVENTION

The subject matter disclosed herein relates to a blade geometry characterization tool and, more particularly, to a tool for airfoil blade geometry characterization that permits quantification of blade geometry during manufacture or repair processes.

Blades used with aircrafts, for example, are generally provided with adjustment features such as trim tabs and weight pockets. These features serve to compensate for manufacturing variations and to achieve interchangeability of one blade with another. However, since the adjustments associated with these features are generally accomplished by flight testing of a blade following manufacture or repair on a whirl tower or an aircraft, the adjustments are referred to as "late process" adjustments and can be expensive in terms of lost flight time.

Since the geometry of each blade affects the aerodynamic properties of each blade, blade geometry may be a significant factor in determining how a blade will perform in flight. Thus, if blade geometry could be quantified during "early process" manufacturing or repair processes, its whirl performance may be predicted. This type of information could be beneficial for planning purposes and may decrease the need for relatively expensive "late process" adjustments.

BRIEF DESCRIPTION OF THE INVENTION

According to one aspect of the invention, a tool is provided for characterizing a blade geometry. The tool includes a first component attachable to a blade root of a blade and a second component attachable to leading and trailing edges of the blade at a blade tip and at multiple stations defined along a span-wise dimension of the blade. The second component is configured for characterization of a chord length of the blade at the blade tip and at the multiple stations. The first and second components are respectively configured for cooperative optical characterization of a sweep and a twist angle of the blade at the blade tip and at the multiple stations.

In accordance with additional or alternative embodiments, the first component includes an optical element.

In accordance with additional or alternative embodiments, the optical element includes at least one of a laser or a sight.

In accordance with additional or alternative embodiments, the second component includes a scale toward which the optical element is aimed for sweep characterization at the blade tip and at the multiple stations.

In accordance with additional or alternative embodiments, the first component includes a first planar surface defining a plane to establish a twist reference angle.

In accordance with additional or alternative embodiments, the plane is substantially parallel with a chord of the blade.

In accordance with additional or alternative embodiments, the second component includes a second planar surface which is comparable with the first planar surface for twist angle characterization at the blade tip and at the multiple stations.

In accordance with additional or alternative embodiments, the second component includes a measuring device for chord length characterization at the blade tip and at the multiple stations.

In accordance with additional or alternative embodiments, the measuring device includes a gage indicator.

In accordance with additional or alternative embodiments, the second component includes a plurality of locating features configured to constrain an orientation of the second component relative to the blade.

According to another aspect of the invention, a method of characterizing a geometry of a blade is provided. The method includes attaching a first component to a blade root of the blade, attaching a second component to leading and trailing edges of the blade at a blade tip and at multiple stations defined along a span-wise dimension of the blade, operating the second component to characterize a chord length of the blade at the blade tip and at the multiple stations and cooperatively operating the first and second components to characterize a sweep and a twist angle of the blade at the blade tip and at the multiple stations.

In accordance with additional or alternative embodiments, the cooperative operating of the first and second components includes aiming an optical element of the first component at a scale of the second component for sweep characterization at the blade tip and at the multiple stations.

In accordance with additional or alternative embodiments, the cooperative operating of the first and second components includes comparing first and second planar surfaces of the first and second components for twist angle characterization at the blade tip and at the multiple stations.

In accordance with additional or alternative embodiments, the operating of the second component includes operating a measuring device for chord length characterization at the blade tip and at the multiple stations.

In accordance with additional or alternative embodiments, the method further includes disposing a plurality of locating features on the second component to constrain an orientation of the second component relative to the blade.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As will be described below, a tool set is provided to characterize blade geometry of a blade by measuring sweep, twist and chord length at various desired blade stations. The blade could be used, for example, on a helicopter, a rotorcraft or other types of aircrafts. The tool set includes two components. One is attached to a blade root end, and is located and oriented with blade-to-hub attachment features. This component houses an optical device that "shoots" down the blade feathering axis and provides a planar surface to be used for establishing a blade twist reference angle. Typically, the blade twist reference plane will be parallel to the blade chord. The second component is attached to the blade tip end or to any blade station where blade geometry characterization is desired. The second component is located and oriented on the blade by interfacing with the blade leading and trailing edges. This second component provides a scale on which the shots from the optical device strike to quantify blade sweep and also provides a planar surface to be used for establishing blade twist angle at the local blade station. Typically, the local blade twist plane will also be parallel to the blade feathering axis and the local blade chord line as established by the leading and trailing edges at the local blade station. This second component also incorporates a dial indicator gage or equivalent feature, which is configured to contact the blade leading edge in such a way that it quantifies blade chord length at the local blade station.

As will be explained below, the quantification of blade sweep, blade twist angle and blade chord length can all be accomplished in a single set up of the two component tool set. This may lead to simplified manufacturing and repair processes and may also permit blade characteristic quantification in the field at reduced cost.

Although prior devices, such as the device disclosed in U.S. Pat. No. 8,196,305, have been used to measure turbine blade geometry, turbine blades are typically much smaller in scale than aircraft blades, such as helicopter blades, and have features and characteristics that differ substantially from aircraft blades. As such, while the tool set described herein provides for sweep, chord length and twist measurements of aircraft blades (e.g., helicopter or other rotorcraft blades), the prior devices do not have similar capabilities.

Figure 1:
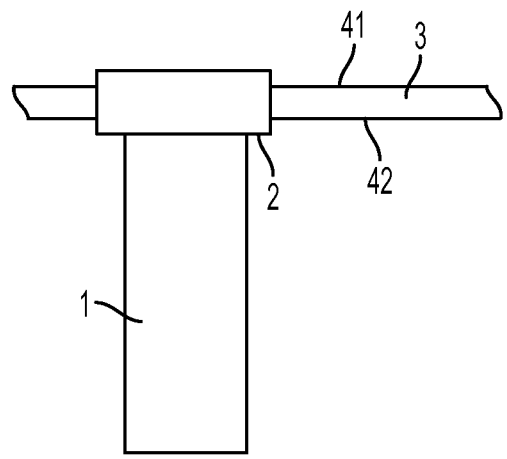
FIG. 1 is a schematic diagram of aircraft components in accordance with embodiments.
Figure 2:
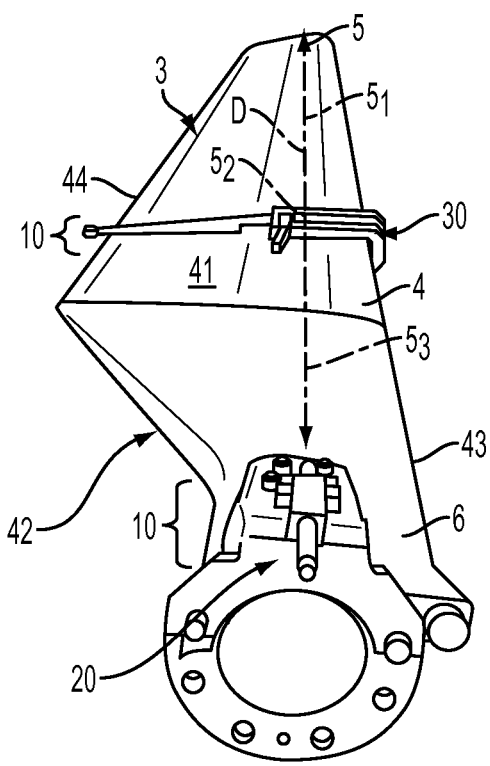
FIG. 2 is a perspective view of an aircraft blade and components of a blade geometry characterization tool in accordance with embodiments.

With reference to FIGS. 1 and 2, an aircraft, such as a helicopter or rotorcraft of any type, typically includes an airframe formed to define a cabin that accommodates a pilot and, in some cases, one or more crewmen and passengers, one or more main rotors provided at an upper portion of the airframe and a tail rotor or propeller provided at a tail portion of the airframe. The aircraft further includes an engine and a transmission system. The engine generates torque and the transmission system transmits the torque from the engine to the one or more main rotors and the tail rotor or propeller. This torque drives rotations of the one or more main rotors and the tail rotor or propeller relative to the airframe for flight control of the aircraft.

Each of the one or more main rotors and the tail rotor or propeller includes a rotor shaft 1 coupled to the engine via the transmission, a hub 2 connected to an end of the rotor shaft 1 and aircraft or rotor blades 3. The rotor blades 3 extend radially outwardly from the hub 2 and each includes an airfoil-shaped main blade portion 4, a blade tip 5 and a blade root 6. The main blade portion 4 has an upper, suction surface 41 and a lower, pressure surface 42 opposite the upper, suction surface 41 as well as a leading edge 43 and a trailing edge 44 opposite the leading edge 43. The blade tip 5 may be airfoil-shaped like the main blade portion 4 and is disposed at a distal (or radially outward) end of the main blade portion 4. The blade root 6 includes various features and components configured to connect the corresponding rotor blade to the hub 2.

As shown in FIG. 2, a tool 10 is provided for characterizing a geometry of the rotor blade 3. The tool 10 includes a first component 20, which is attachable to the blade root 6, and a second component 30, which is attachable to the leading and trailing edges 43 and 44 of the rotor blade 3 at the blade tip 5 and at multiple stations $5_{(1-3)}$ defined along a span-wise dimension D of the rotor blade 3. The second component 30 is configured such that the second component 30 can be used to characterize a chord length of the rotor blade 3 at the blade tip 5 and at the multiple stations $5_{(1-3)}$. The first and second components 20 and 30 are respectively configured such that they can be used to cooperatively and optically characterize a sweep and a twist angle of the rotor blade 3 at the blade tip 5 and at the multiple stations $5_{(1-3)}$. Although the multiple stations $5_{(1-3)}$, are illustrated in FIG. 2 as being defined at particular span-wise locations, it is to be understood that these locations are merely exemplary and that the multiple stations $5_{(1-3)}$ can be defined at various other locations and that there may be more or less than three defined stations.

Figure 3:
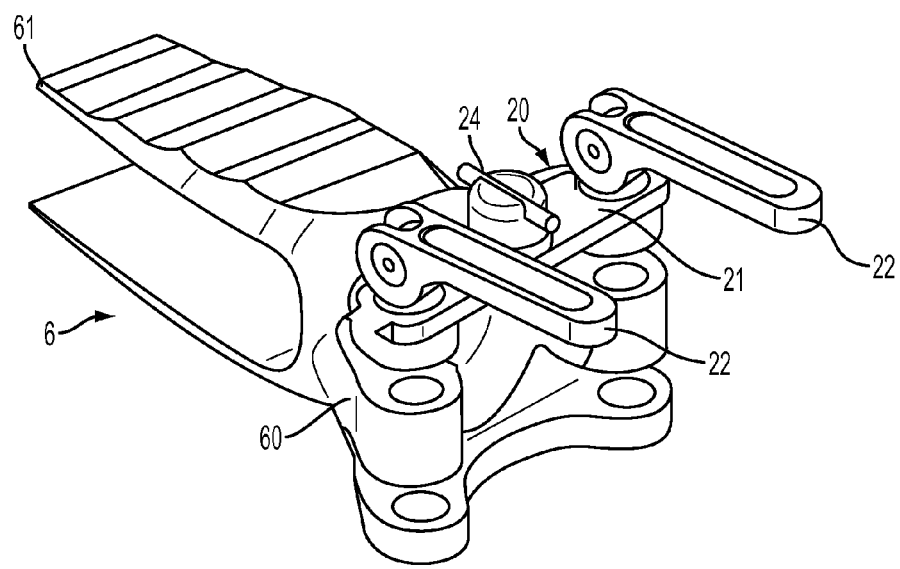
FIG. 3 is a perspective view of a first one of the components of FIG. 2 in accordance with embodiments.
Figure 4:
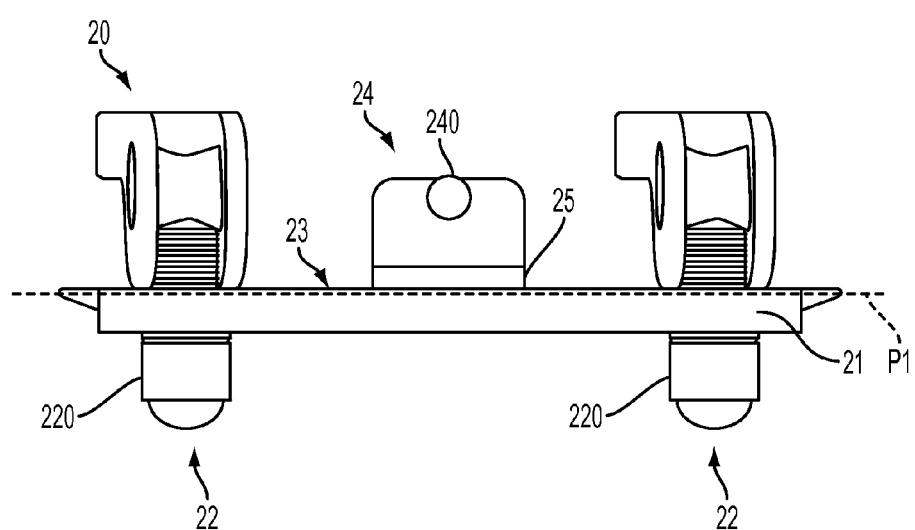
FIG. 4 is an elevation view of the first one of the components of FIG. 2 in accordance with embodiments.
Figure 5:
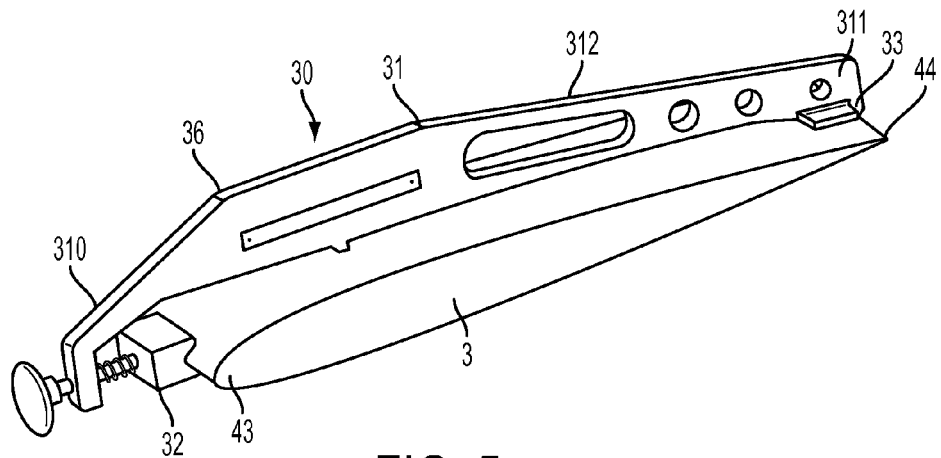
FIG. 5 is a perspective view of a second one of the components of FIG. 2 in accordance with embodiments.
Figure 6:
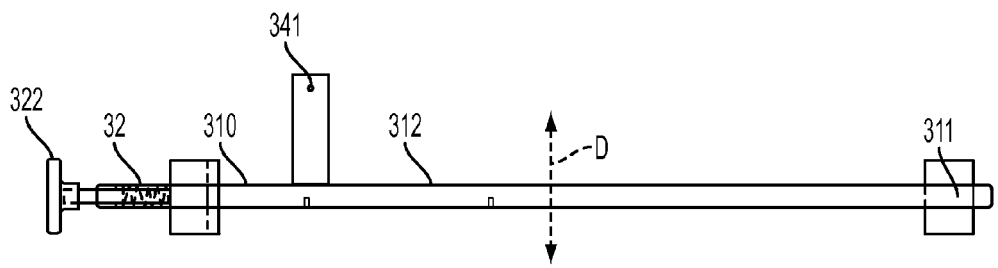
FIG. 6 is a plan view of the second one of the components of FIG. 2 in accordance with embodiments.
Figure 7:
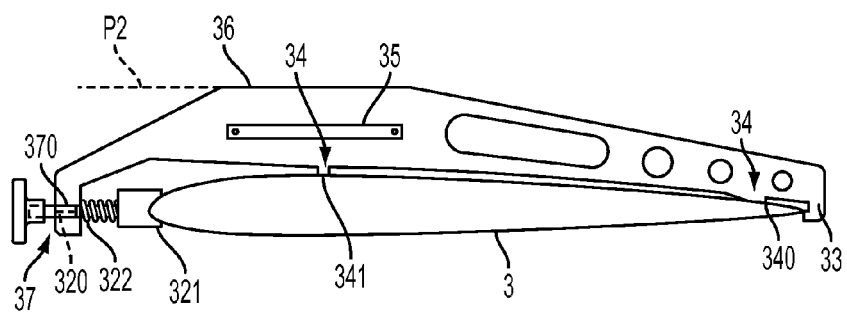
FIG. 7 is an elevation view of the second one of the components of FIG. 2 in accordance with embodiments.

With reference to FIGS. 2, 3 and 4, the first component 20 may include a body 21 that is securely attachable to the blade root 6, attachment elements 22, a first planar surface 23 and an optical element 24. The body 21 may be provided as a substantially rigid feature that is mobile and that may be movable by a human operator. The body 21 is disposable on a yoke element 60 of the blade root 6, which is generally disposed inboard from a stem element 61. The body 21 is formed to define through-holes proximate to attachment features of the yoke element 60. The attachment elements 22 are extendable through the through-holes whereby the attachment elements 22 can be selectively registered with the attachment features. In accordance with embodiments, the attachment elements 22 may include expanding pins 220.

The first planar surface 23 may be formed or provided as an exterior surface of the body 21 that can be viewable in concert with a corresponding second planar surface 36 of the second component 30 (to be described below). The first planar surface 23 is formed to define a first plane P1 by which a twist reference angle of the rotor blade 3 may be established. The first plane P1 may be substantially parallel with a chord of the rotor blade 3. The optical element 24 may include at least one of a laser 240 and/or an optical sight that is/are supported on the body 21 by a podium 25. The podium 25 may be adjustable for calibration purposes.

With reference to FIGS. 2 and 5-7, the second component 30 includes an elongate body 31 having a first end 310, a second end 311 and a central section 312 interposed between the first and second ends 310 and 311. The second component 30 may be disposed such that the first end 310 corresponds to the leading edge 43 of the rotor blade 3 and the second end 311 corresponds with the trailing edge 44. The second component 30 further includes a pressure element 32 at the first end 310 and a hook element 33 at the second end 311.

The pressure element 32 may be provided as a flange 320 traversing the leading edge 43, a pressurizing element 321 that is movable relative to the flange 320 and a spring loaded adjustment element 322, which is operable by a human operator to move the pressurizing element 321 relative to the flange 320. In accordance with embodiments, the hook element 33 may be configured to hook onto the trailing edge 44 and the pressurizing element 321 may be provided with a surface that mimics the surface of the rotor blade 3 around the leading edge 43 such that the pressurizing element 321 is configured to hook onto the leading edge 43. With these features, the human operator can manipulate the adjustment element 322 to tighten and secure the rotor blade 3 between the hook element 33 and the pressurizing element 321.

The second component 30 may further include a plurality of locating features 34, a scale 35, the second planar surface 36 and a measuring device 37. The locating features 34 may be disposed along the elongate body 31 and/or at one or both of the first and second ends 310 and 311. The locating features 34 are configured to constrain an orientation of the second component 30 and the elongate body 31 relative to the rotor blade 3 and may include, for example, a boss 340 at the second end 311 and an elongate boss 341 extending in the span-wise dimension D away from the central section 312 to be in some cases disposable coincident with tip cap attachment holes.

In accordance with alternative embodiments, the boss 340 may tend to resist biases applied by the pressure element 32 and the hook element 33. In such cases, the boss 340 may be relocated such that there would be a gap or interference element at the location of the boss 340 in FIG. 7. Such relocation would result in the boss 340 being rigged such that the boss 340 is not in line with or not in the same station as the pressure element 32 and the hook element 33 to thereby provides lateral stability and to constrain an orientation of the second component 30.

The scale 35 may be provided on a surface of the elongate body 31 to face toward the optical element 24 of the first component 20. The scale 35 may be provided as a ruler toward which the optical element 24 is aimed and by which a distance between a baseline 241 and a point where the emissions 242 of the laser 240 are incident on the scale 35 can be ascertained during sweep characterization operations at the blade tip 5 and at the multiple stations $5_{(1-3)}$. The second planar surface 36 may be formed as an upper surface of the elongate body 31 to define a second plane P2 and is viewable in concert with the first planar surface 23. The orientation of the second planar surface 36 is thus comparable with that of the first planar surface 23 for twist angle characterization operations at the blade tip 5 and at the multiple stations $5_{(1-3)}$. The measuring device 37 may include, for example, a gage indicator 370 or a slidable caliper and is disposable at the first end 310 for chord length characterization operations at the blade tip 5 and at the multiple stations $5_{(1-3)}$.

Figure 8:
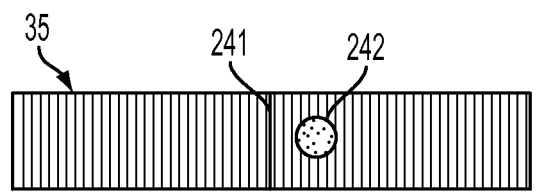
FIG. 8 is a schematic illustration of a sweep characterization operation.
Figure 9:
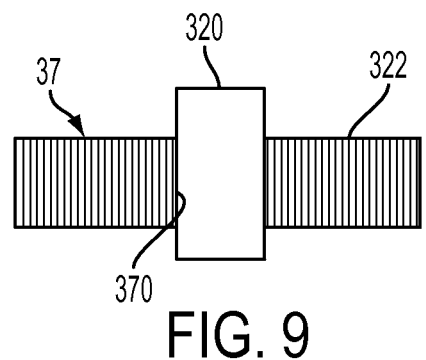
FIG. 9 is a schematic illustration of a chord length characterization operation.
Figure 10:
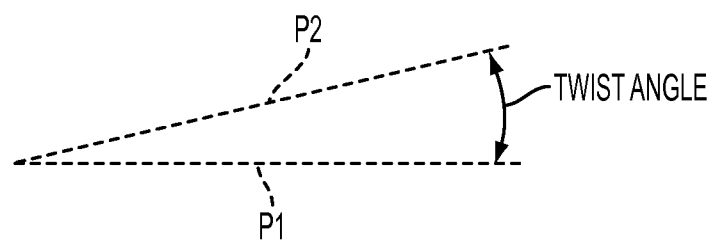
FIG. 10 is a schematic illustration of a twist angle characterization operation.

With reference to FIGS. 8-10, the sweep characterization, chord length characterization and twist angle characterization operations will now be described. As shown in FIG. 8, a sweep of the rotor blade 3 at a given span-wise position of the second component 30 along the rotor blade 3 may be ascertained by measuring the distance between the baseline 241 and the point where the emissions 242 of the laser 240 are incident on the scale 35. As shown in FIG. 9, a chord length of the rotor blade 3 at a given span-wise position of the second component 30 may be ascertained by measuring relative positions of the adjustment element 322 and the flange 320. As shown in FIG. 10, a twist angle of the rotor blade 3 at a given span-wise position of the second component 30 may be ascertained by comparing the first and second planes P1 and P2 of the first and second planar surfaces 23 and 36 and by determining from that comparison the angle apparently formed by the optical intersection of the first and second planar surfaces 23 and 36.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A tool for characterizing a blade geometry, the tool comprising:
   a first component attachable to a blade root of a blade, the first component including an optical element; and
   a second component attachable to leading and trailing edges of the blade at a blade tip and at multiple stations defined along a span-wise dimension of the blade,
   the second component having a measuring device configured for characterization of a chord length of the blade at the blade tip and at the multiple stations, the second component further including a scale toward which the optical element is aimed, and
   the first and second components being respectively configured for cooperative optical characterization of a sweep and a twist angle of the blade at the blade tip and at the multiple stations.

2. The tool according to claim 1, wherein the optical element comprises at least one of a laser and a sight.

3. The tool according to claim 1, wherein the optical element is aimed at the scale for sweep characterization at the blade tip and at the multiple stations.

4. The tool according to claim 1, wherein the first component comprises a first planar surface defining a plane to establish a twist reference angle.

5. The tool according to claim 4, wherein the plane is substantially parallel with a chord of the blade.

6. The tool according to claim 4, wherein the second component comprises a second planar surface which is comparable with the first planar surface for twist angle characterization at the blade tip and at the multiple stations.

7. The tool according to claim 1, wherein the measuring device comprises a gage indicator.

8. The tool according to claim 1, wherein the second component comprises a plurality of locating features configured to constrain an orientation of the second component relative to the blade.

9. The tool according to claim 1, wherein the second component comprises a first end and a second end, the measuring device disposed at the first end of the second component.

10. The tool according to claim 9, wherein the second component is disposable on the blade such that the first end of the second component corresponds to the leading edge of the blade, and the second end of the second component corresponds to the trailing edge of the blade.

11. A method of characterizing a geometry of a blade, the method comprising:
- attaching a first component to a blade root of the blade, the first component including an optical element;
- attaching a second component to leading and trailing edges of the blade at a blade tip and at multiple stations defined along a span-wise dimension of the blade, the second component further having a measuring device and a scale;
- operating the measuring device of the second component to characterize a chord length of the blade at the blade tip and at the multiple stations; and
- cooperatively operating the first and second components to characterize a sweep and a twist angle of the blade at the blade tip and at the multiple stations, wherein the cooperative operating of the first and second components comprises aiming the optical element of the first component at the scale of the second component for sweep characterization at the blade tip and at the multiple stations.

12. The method according to claim 11, wherein the cooperative operating of the first and second components comprises comparing first and second planar surfaces of the first and second components for twist angle characterization at the blade tip and at the multiple stations.

13. The method according to claim 11, further comprising disposing a plurality of locating features on the second component to constrain an orientation of the second component relative to the blade.

14. The method according to claim 11, wherein the second component comprises a first end and a second end, the measuring device disposed at the first end of the second component, and attaching the first end of the second component to the leading edge of the blade, and the second end of the second component to the trailing edge of the blade.

* * * * *